(12) United States Patent
Sachs et al.

(10) Patent No.: US 9,275,396 B2
(45) Date of Patent: Mar. 1, 2016

(54) PERSONALIZED DISCOUNT KEYS FOR ENTERPRISE ONLINE STORES

(75) Inventors: Marco Sachs, St. Leon-Rot (DE); Pascal Scheuermann, Mannheim (DE)

(73) Assignee: SAP SE, Walldorf (DE)

( * ) Notice: Subject to any disclaimer, the term of this patent is extended or adjusted under 35 U.S.C. 154(b) by 532 days.

(21) Appl. No.: 13/476,473

(22) Filed: May 21, 2012

(65) Prior Publication Data
US 2013/0311263 A1 Nov. 21, 2013

(51) Int. Cl.
*G06Q 30/02* (2012.01)
(52) U.S. Cl.
CPC .................................. *G06Q 30/0207* (2013.01)
(58) Field of Classification Search
CPC ................................................. G06Q 30/0207
See application file for complete search history.

(56) References Cited

U.S. PATENT DOCUMENTS

2010/0280960 A1* 11/2010 Ziotopoulos et al. ........... 705/80

OTHER PUBLICATIONS

Wikipedia [online] "Online shopping" Last modified May 19, 2012 [Retrieved from the Internet May 21, 2012] <URL: http://en.wikipedia.org/wiki/Online_shopping>.
Wikipedia [online] "Electronic commerce" Last modified May 20, 2012 [Retrieved from the Internet May 21, 2012] <URL: http://en.wikipedia.org/wiki/E-commerce>.

\* cited by examiner

*Primary Examiner* — Thomas Dixon
(74) *Attorney, Agent, or Firm* — Fish & Richardson P.C.

(57) ABSTRACT

The present disclosure relates to computer-implemented methods, software, and systems for generating and using discount keys associated with a particular sales person in association with sales within an enterprise online store. One example process includes operations for (i) identifying a discount key at a sales system associated with a prospective sale negotiated between a sales person and a prospective customer, (ii) determining at least one item associated with the identified discount key, (iii) determining at least one discount associated with the determined items associated with the identified discount key, (iii) facilitating completion of the prospective sale at the sales system for the prospective customer based on the at least one determined discount associated with the at least one determined item, and (iv) associating the completion of the prospective sale at the sales system with a sales account for the sales person.

19 Claims, 5 Drawing Sheets

PERSONALIZED DISCOUNT KEYS FOR ENTERPRISE ONLINE STORES

TECHNICAL FIELD

The present disclosure relates to computer-implemented methods, software, and systems for generating and using discount keys associated with a particular sales person in association with sales within an enterprise online store.

BACKGROUND

In an enterprise sales environment, it is common to sell software and other items through a sales person, where discounts are negotiated individually. The buyer's agent, purchaser, or other employee can leverage the amount of business being generated, personal relationships, and other interpersonal communications to generate better or individualized discounts. These discussions with the sales person may be performed in person, over the phone, or through a computer chat session, as well as others.

Online sales provide individuals and enterprises with the ability to quickly login to a secure session, identify one or more products, software, or other items for purchase, and complete the transaction without interacting with sales persons. In many cases, however, online sales, both for personal and business purchases, remove the ability for bargaining, discounts, and general interpersonal interactions.

SUMMARY

The present disclosure relates to computer-implemented methods, software, and systems for generating and using discount keys associated with a particular sales person in association with sales within an enterprise online store. One example process includes operations for (i) identifying a discount key at a sales system associated with a prospective sale negotiated between a sales person and a prospective customer, (ii) determining at least one item associated with the identified discount key, (iii) determining at least one discount associated with the determined items associated with the identified discount key, (iii) facilitating completion of the prospective sale at the sales system for the prospective customer based on the at least one determined discount associated with the at least one determined item, and (iv) associating the completion of the prospective sale at the sales system with a sales account for the sales person.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
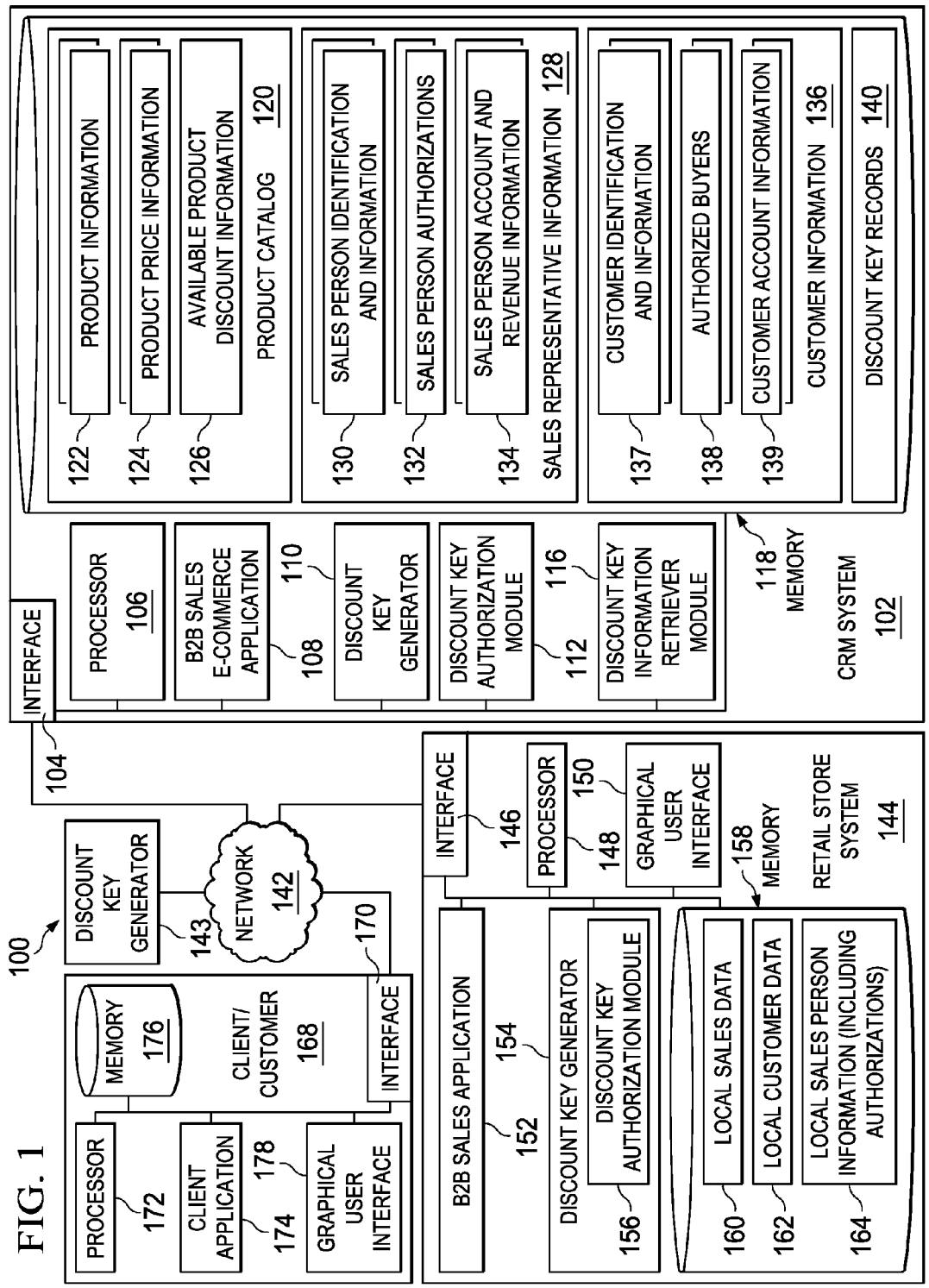
FIG. 1 is a block diagram illustrating an example system for generating and using discount keys associated with a particular sales person in association with sales within an enterprise online store.

The present disclosure relates to computer-implemented methods, software, and systems for generating and using discount keys associated with a particular sales person in association with sales within an enterprise online store. Generally, the present disclosure describes methods for combining aspects of personalized enterprise software (and other items) sales with the benefits on an online store. The combination can allow for prices and sales to be individually negotiated for prices, discounts, and other terms based on personal interactions between the prospect (e.g., a purchasing agent) and the sales person. However, the prospect can still make use of a corresponding online store associated with the products being negotiated, thereby benefiting from the functionality and benefits of the online store, including processing, tracking, and other aspects. In addition to advantages to the prospect, the sales person can be removed from contract administration (e.g., finalizing the sale and enforcing the sales terms and provisions), while still working to negotiate the sale and agreement himself. Once terms are finalized, a personalized code associated with the prospect and the negotiated sale terms (e.g., including any discounts, exceptions, etc.), can be generated and provided to the prospect. The prospect can then use that personalized code when interacting with the online store to apply at least a portion of the sales terms to the online store session. The sales can be completed via the online store, while ensuring that the negotiated terms are applied to the current sale, and further, that the sale is associated with the corresponding sales person's account for quota, bonus, and commission purposes. In this manner, the efficiencies of the online store can be used without removing the personal aspect of enterprise sales and its associated negotiations, providing benefits to both the prospect and sales person.

The present disclosure describes providing a code generator with the individual sales person, allowing the sales person to provide a customer-specific and online store-compatible discount code which contains the individually negotiated prices and discounts. The discount code can be provided to the prospect via a print-out, bar code, number/letter string, or other suitable form. During interactions with the online store, the prospect and/or the sales person can enter the generated discount code, which can be analyzed to determine the items to be purchased at the negotiated prices. The prospect can then finalize the transaction through the online store's normal functionality and processes.

The described process is beneficial, particularly in an enterprise sales world, as software and system sales are more complicated due to the high average price and complexity of enterprise sales. Due to their size and complexity, prospects may desire to reduce costs or increase the quality of the sale through negotiations and requests for additional information. In those instances, personalized sales persons can assist in the negotiation process, working to determine and finalize the present sale. By providing a discount code specific to the prospect/customer, and to the specific details of the sale, the personalized process can easily by moved to the online sales environment. The discount code may include prospect/customer information, sales person information, store element and item information, and the individual price or negotiated discount associated with the transaction. In some instances, the discount code may include or be associated with a validity time or period for which the negotiated discount code is valid or available for use.

FIG. 1 is a block diagram illustrating an example system 100 for generating and using discount keys associated with a particular sales person in association with sales within an enterprise online store. Specifically, the illustrated environment 100 includes, or is communicably coupled with, a customer relationship management (CRM) system 102, a retail store system 144, at least one client 168, and a network 142.

In general, the CRM system 102 is a server or plurality of servers capable of performing functions associated with online sales and providing customer, product, and sales person management-related functionality. The CRM system 102 may be part of an end-to-end enterprise resource planning system. The CRM system 102 and its various components can be used to run at least a portion of the processes associated with a business-to-business (B2B) sales e-commerce application (B2B application) 108. The B2B application 108 may also be related to business-to-consumer (B2C) transactions, as well as other types of sales. In some instances, the CRM system 102 may also include e-commerce applications for non-business users, which may also be incorporated into the B2B application 108. The B2B application 108 can access information within the CRM system 102 related to products, sales representatives, customers, and discounts, among others. In some implementations, the CRM system 102 may store, execute, or be associated with a plurality of applications in addition to the B2B application 108. In other implementations, the CRM system 102 may be a dedicated system or server meant to store and execute only the B2B application 108. In some implementations, the CRM system 102 may comprise or be associated with at least one Web server, where the B2B application 108 represents one or more Web-based applications accessed and executed by the client 168 and/or retail store system 144 via the network 142 or directly at the CRM system 102 to perform the programmed tasks or operations of the B2B application 108.

At a high level, the CRM system 102 comprises an electronic computing device operable to receive, transmit, process, store, or manage data and information associated with the environment 100. Specifically, the CRM system 102 illustrated in FIG. 1 is responsible for receiving application requests, for example, e-commerce-related requests, from one or more client applications associated with the client 168 and/or the retail store system 144 of the environment 100 and responding to the received requests by processing said requests in the associated B2B application 108, and sending the appropriate response from the B2B application 108 back to the requesting client application. In addition to those requests, requests associated with the B2B application 108 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single CRM system 102, environment 100 can be implemented using two or more servers, as well as computers other than servers, including a server pool. Indeed, CRM system 102 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, illustrated CRM system 102 may be adapted to execute any operating system, including Linux, UNIX, Windows, Mac OS®, Java™, Android™, iOS or any other suitable operating system. According to one implementation, CRM system 102 may also include or be communicably coupled with an e-mail server, a Web server, a caching server, a streaming data server, and/or other suitable server. Similar flexibility and variation may be associated with the other components illustrated in FIG. 1, including client 168 and retail store system 144, each of which may be comprised of different components, component types, and operating systems in different implementations.

The CRM system 102 also includes an interface 104, a processor 106, and a memory 118. The interface 104 is used by the CRM system 102 for communicating with other systems in a distributed environment—including within the environment 100—connected to the network 142, for example, the client 168 and/or the retail store system 144, as well as other systems communicably coupled to the network 142 (not illustrated). Generally, the interface 104 comprises logic encoded in software and/or hardware in a suitable combination and operable to communicate with the network 142. More specifically, the interface 104 may comprise software supporting one or more communication protocols associated with communications such that the network 142 or interface's hardware is operable to communicate physical signals within and outside of the illustrated environment 100.

Generally, the CRM system 102 (and other components within environment 100) may be communicably coupled with a network 142 that facilitates wireless or wireline communications between the components of the environment 100, as well as with any other local or remote computer, such as additional clients, servers, or other devices communicably coupled to network 142, including those not illustrated in FIG. 1. In the illustrated environment, the network 142 is depicted as a single network, but may be comprised of more than one network without departing from the scope of this disclosure, so long as at least a portion of the network 142 may facilitate communications between senders and recipients. In some instances, one or more of the components associated with the system may be included within the network 142 as one or more cloud-based services or operations.

The network 142 may be all or a portion of an enterprise or secured network, while in another instance, at least a portion of the network 142 may represent a connection to the Internet. In some instances, a portion of the network 142 may include a portion of a cellular or mobile data network or other network capable of relaying short message service (SMS) or multimedia messaging service (MMS) messages, as well as other suitable mobile data messaging. In some instances, a portion of the network 142 may be a virtual private network (VPN). Further, all or a portion of the network 142 can comprise either a wireline or wireless link. Example wireless links may include 802.11a/b/g/n, 802.20, WiMax, 3G, 4G (i.e., LTE), and/or any other appropriate wireless link. In other words, the network 142 encompasses any internal or external network, networks, sub-network, or combination thereof operable to facilitate communications between various computing components inside and outside the illustrated environment 100. The network 142 may communicate, for example, Internet Protocol (IP) packets, Frame Relay frames, Asynchronous Transfer Mode (ATM) cells, voice, video, data, and other suitable information between network addresses. The network 142 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the CRM system 102 includes a processor 106. Although illustrated as a single processor 106 in FIG. 1, two or more processors may be used according to particular needs, desires, or particular implementations of the environment 100. Each processor 106 may be a central processing unit (CPU), a blade, an application specific integrated circuit (ASIC), a field-programmable gate array (FPGA), or another suitable component. Generally, the processor 106 executes instructions and manipulates data to perform the operations of the CRM system 102. Specifically, the processor 106 executes the functionality required to receive and respond to requests from the retail store system 144, the client 168, as well as to perform the operations associated with the B2B application 108, the CRM system 102 as a whole, and their related modules and functionality.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The CRM system 102 is illustrated as including several applications, modules, and other software to be executed by the processor 106, including the B2B application 108, a discount key generator 110, a discount key authorization module 112, and a discount key information retriever module 116. As described earlier, the B2B application 108 can be any application, program, or other software for managing and performing operations associated with B2B (or other suitable) transactions, and particularly, associated with enterprise sales. Items for sale may include software, as well as tangible and other intangible goods or services. The B2B application 108 can, for example, be used to enable personalized discount codes generated by sales persons and identified within the CRM system 102. In some instances, the B2B application 108 may work in conjunction with one or more of the other modules illustrated in FIG. 1, such as the discount key authorization module 112 and a discount key information retriever module 116.

The discount key authorization module 112 may be used to authorize a particular discount code entered by a user via the B2B application 108, such as during a sales process. The discount key authorization module 112 can identify the entered discount code, and determine the corresponding discount key information associated therewith. In some instances, discount keys may be generated based at least in part on the items selected during the negotiation phase, a customer identification or identifier (ID), a sales person name or ID, and the negotiated discount or prices. In some instances, some combination of the above data, as well as other suitable information, may be hashed or otherwise encrypted upon discount key generation. The discount key authorization module 112 is used to confirm that the discount or prices associated with the discount key are allowed, particularly with regard to the sales person who negotiated with the prospect or customer to define prices. In some instances, the discount key authorization module 112 can also determine if the discount key remains valid, such as based on a validity time or period associated with the discount key. Further, the discount key authorization module 112 may also be used to confirm that the prospect or customer using the discount key is an authorized purchaser and user of the discount key. In some instances, the customer ID from the discount key may be compared to the person or entity involved in the purchase transaction.

In some instances, at least some of the information associated with the discount key may be combined and then hashed and/or encrypted to provide the generated discount key. In other instances, a unique discount key may be generated, with the details of the generated discount key stored at a database or other location at the CRM system 102. In still other instances, the discount key may represent a concatenated set of data related to at least a portion of the information described above, such that parsing the discount key can provide a full or partial understanding of the information encoded within the discount key. In still other instances, the information associated with the discount key may be transformed or encoded into a bar code, 2-D bar code, QR code, or suitable information representation. In some instances, the discount key may be generated by a discount key generator 110 at the CRM system 102, a discount key generator 154 at the retail store system 144, or a discount key generator 143 located remotely from the retail store system 144 or CRM system 102. In some instances, the discount key authorization module 112 may check, upon an attempt to create or generate a discount key, whether the corresponding sales person is authorized to offer the particular discount. If the sales person is not so authorized, the negotiated discount may be rejected, or a manager's approval may be necessary prior to allowing the discount key to be generated. In addition to the sales person's authorization, the discount key authorization module 112 may also determine whether a particular item or service is authorized to be discounted. In some instances, products or services may be restricted for possible discounts, such as based on manufacturer or developer contracts. In those instances, an attempted discount may be refused based on information associated with the corresponding product. Still further, the discount key authorization module 112 may further check to determine whether the prospective customer is eligible for a particular discount, or whether the discount corresponds to a predefined range of allowable discounts for the prospective customer or an entity or organization associated with the prospective customer.

The discount key authorization module 112 may use or interface with the discount key information retriever module 116 to identify the information associated with the discount key at the time of purchase, or when the discount key is being used in association with a purchase. For example, where the discount key has a unique identifier, the discount key information retriever module 116 can use the unique identifier to access discount key records 140 stored in memory 118. The discount key information retriever module 116 may also be able to interpret the discount key where the discount key is hashed or encrypted. In other instances, the discount key information retriever 116 can decode, decrypt, and/or decipher the information stored within the discount key. In some instances, however, when the information associated with the discount key is retrieved, the discount key information retriever 116 can provide the B2B application 108 with the corresponding information. In some instances, this may include populating a shopping cart associated with the B2B application 108 with the items for purchase and their corresponding sales price as negotiated. Where a user of the B2B application 108 has already selected particular items associated with the discount key and placed them in the shopping cart prior to providing the discount key, the discount key information retriever module 116 can update the prices (and, where suitable, the products or items) within the shopping cart.

Information and rules used to make some or all of the determinations associated with the discount key generation and redemption may be stored in memory 118 of the CRM system 102. Memory 118 may be a single or multiple memories. The memory 118 may include any type of memory or database module and may take the form of volatile and/or non-volatile memory including, without limitation, magnetic media, optical media, random access memory (RAM), read-only memory (ROM), removable media, or any other suitable local or remote memory component. The memory 118 may store various objects or data, including caches, classes, frameworks, applications, backup data, business objects, jobs, web pages, web page templates, database tables, repositories storing business and/or dynamic information, product information, customer information, sales person information, and any other appropriate information including any parameters, variables, algorithms, instructions, rules, constraints, or references thereto associated with the purposes of the CRM system 102. Additionally, the memory 118 may include any other appropriate data, such as VPN applications, firmware logs and policies, firewall policies, a security or access log, print or other reporting files, as well as others.

As illustrated in FIG. 1, memory 118 includes a product catalog 120 storing product-related information. The product catalog 120 may include information defining, describing, or otherwise providing information related to products and/or services available through or associated with an e-commerce site or from a particular seller. For example, the product catalog 120 may include a set of product information 122 describing one or more products and their specifications. In some instances, the product catalog 120 may also include services, such as services related to one or more products (e.g., service, maintenance, or installation services, among others).

A set of associated product price information 124 may also be stored in the product catalog. The product price information 124 may define, in some instances, the standard, non-negotiated prices of each product. Additionally, the product catalog 120 may include a set of available product discount information 126. This information may be provided on a product-by-product basis, by a manufacturer or developer basis, or other suitable bases. The available product discount information 126 can provide information as to the allowable discounts that can be provided on particular products or services. For instance, company A may not allow their product to be discounted more than 5%, while company B may allow discounts up to 20%. Still further, company C may not allow any discounts on their software, while offering some discounts on their services. In another example, the retailer associated with the CRM system 102 may limit all discounts to a certain level, such that regardless of the allowable discounts by particular manufacturers and developers, the retailer's available discount information limits the possible discounts. This set of information can be used by the various participants in the illustrated system, including sales persons at the retail store system 144, as well as the various discount key authorization modules 112, 156 to ensure that an offered discount is valid on a particular product or service.

Memory 118 further includes a set of sales representative information 128. The sales representative information 128 may include information associated with the sales person associated with a particular negotiated discount. As illustrated, the sales representative information 128 includes a sales person ID and related information 130, an associated set of sales person authorizations 132, and a set of sales person account and revenue information 134. The sales person ID and related information 130 can define each sales person associated with the CRM system 102, providing unique identifiers allowing sales persons to easily and efficiently coordinate sales-related activities under a single and unique sales person ID. The sales person authorization information 132 can include a sales person-specific set of information defining the level of authorization upon which a particular sales person can offer or negotiate various discounts with prospects. For example, a new sales person may be limited in the amount of a discount that can be made without supervisor approval. This information, as well as the discount amount available to a supervisor, can be stored in and referenced from the sales person authorization information 132. Finally, the sales person account and revenue information 134 can be associated with the sales person IDs, allowing sales to be associated with the initiating, originating, and/or closing sales person. When a sale completes within the illustrated system, the sales person account associated with the sales person ID embedded in, associated with, or otherwise referenced by, the discount key can be credited as appropriate to the transaction, thereby allowing the CRM system 102 and B2B application 108 to perform the sales functionality while adequately crediting the associated sales person for the negotiation and other pre-sales activity performed in connection with the completed transaction.

Memory 118 is further illustrated as including the set of discount key records 140. The set of discount key records 140 can include one or more tables storing information associated with the various discount keys generated throughout the illustrated environment 100. When a discount key is received, related information can sometimes be found in the discount key records 140, such as when the discount key is merely a unique identifier associated with information stored within the discount key records 140. In other instances, the discount key records 140 may not be necessary, such as when the entire set of information associated with a discount key is included within or directly derivable from the discount key itself. In some instances, the discount key records 140 can store information on each discount negotiated by various sales persons, providing data that can be analyzed and mined to determine particular pricing and negotiation activity over a period of time.

As illustrated, memory 118 further includes a set of customer information 136. The set of customer information 136 can include information associated with one or a plurality of customers associated with the illustrated system. In other instances, at least a portion of the customer information 136 may be associated with customers from one or more external systems, such as those who previously engaged in transactions or interactions with one or more related applications or systems. In some instances, the customer information 136 may also define information associated with a plurality of potential customers.

In the illustrated example, the set of customer information 136 includes a set of customer IDs and related information 137. This can provide unique identifiers for some or all of the customers, and can allow the B2B application 108 to identify each customer interacting with the system. In some instances, portions of the customer ID and information 137 may be associated with individuals, while in others, they may be associated with corporate customers or other entities. As also illustrated, the customer information 136 may include information on one or more authorized buyers 138. The authorized buyers 138 may be individuals associated with, employed by, or made agents of the corporate customers or other entities, which are authorized to negotiate and complete transactions on behalf of those corporate customers or other entities. In some instances, the authorized buyers 138 may be associated with the particular customers and checked during the negotiation and sale finalization processes to ensure proper authorizations are available. The customer information 136 may also include customer account information 139, which can store information defining customer-specific methods of payment, terms of payment, credit line information, and any other customer-specific or customer-related information associated with the purchasing and negotiating process. In some instances, the customer account information 139 may provide information on discount rates or prices to be applied on each purchase for some customers. In those instances, the negotiation process may occur on an entity-wide level, such that each subsequent purchase has the corresponding discount automatically applied. In other instances, the customer account information 139 may include information on the maximum possible discount available to a particular customer. If the maximum discount is exceeded or attempted to be exceeded, the system can identify the issue and notify the sales person, a manager, or another appropriate person or entity.

In some instances, some or all of the components described within CRM system 102, including memory 118 and its stored portions, may be stored and/or located remotely from the CRM system 102. In those instances, the remote portions may be communicated with via network 142, allowing for accessing of and interacting with data as needed.

The illustrated environment 100 of FIG. 1 also includes the retail store system 144, or multiple retail store systems 144. The retail store system 144 may be any computing device operable to connect to or communicate with at least the CRM system 102 via the network 142 using a wireline or wireless connection. In general, the retail store systems 144 comprises an electronic computer device operable to receive, transmit, process, and store any appropriate data associated with the environment 100 of FIG. 1, and specifically, where a portion of the interactions associated with generating and using discount keys associated with a particular sales person in association with sales within an enterprise online store can occur. In some instances, the retail store system 144 may be associated with a physical brick-and-mortar store where prospective customers and prospects can visit, interact with a sales person located at the physical retail store, and negotiate individual or entity-based discounts on products or services. In some instances, the retail store system 144 may also be associated with a telephone service, where prospective customers and other prospects speak on the phone, web chat, or other remote communication means to negotiate and discuss terms for a product or service.

The illustrated retail store system 144 includes an interface 146, a processor 148, a GUI 150, a memory 158, a B2B sales application 152 (where the B2B sales application 152 could also be a B2C sales application, as well as an application capable of performing and assisting in various types of transactions), and a discount key generator 154. Interface 146 and processor 148 may be similar to, or different from, the interface 104 and processor 106 illustrated in the CRM system 102. The GUI 150 can interface with at least a portion of the environment 100 for any suitable purpose, including generating a visual representation of a Web browser, presenting a catalog of goods or services offered by or associated with the retail store system 144, or performing other suitable actions at the retail store system 144. In some instances, the GUI 150 may be used to view and navigate various Web pages located both internally and externally to the illustrated system, including the B2B application 108 at the CRM system 102 or the B2B sales application 152 at the retail store system 144. The B2B sales application 152 at the retail store system 144 may be a local client application associated with the B2B application 108 of the CRM system 102, as well as a different dedicated application associated with the retail store system 144, where the B2B sales application 152 allows prospective customers to interact with an interactive catalog to learn more about certain products or services, including with the assistance of the sales person, that allows the customers to educate themselves on particular products and be better positioned for the negotiation phase of the potential sale. In some instances, the B2B sales application 152 may be a web browser which can execute a web service or web-based application associated with the B2B application 108 of the CRM system 102. In some instances, the prospective customer may directly operate the B2B sales application 152, while in others, the B2B sales application 152 may be operated by the sales person assisting the prospective customer with the transaction.

The GUI 150 may provide a graphical user interface to the B2B sales application 152 operable to, for example, allow the user of the B2B sales application 152 to interface with at least a portion of the B2B application 108 and its associated operations and functionality, as well as other applications. Generally, the GUI 150 provides the particular user with an efficient and user-friendly presentation of business data provided by or communicated within the system. The GUI 150 may comprise a plurality of customizable frames or views having interactive fields, pull-down lists, and buttons operated by the user. For example, the GUI 150 may provide interactive elements that allow a user to interact with a particular CRM system 102, as well as other components within and/or external to environment 100. The different portions of the CRM system's functionality may be presented and accessible to the user through the GUI 150, such as through the B2B sales application 152. The GUI 150 may present information associated with the B2B sales application 152 for viewing and interaction. In general, the GUI 150 is often configurable, supports a combination of tables and graphs (bar, line, pie, status dials, etc.), and is able to build real-time portals, where tabs are delineated by key characteristics (e.g., site or microsite). Therefore, the GUI 150 contemplates any suitable graphical user interface, such as a combination of a generic web browser, intelligent engine, and command line interface (CLI) that processes information in the platform and efficiently presents the results to the user visually.

The discount key generator 154 of the retail store system 144 may be similar to the discount key generator 110 described within the CRM system 102, and can assist in generating a discount key including or referencing the information defining the products selected and the corresponding discounts and/or negotiated prices associated therewith. As illustrated in FIG. 1, the discount key generator 154 includes the discount key authorization module 156, which itself can be similar to the discount key authorization module 112 described in reference to the CRM system 102. The discount key authorization module 156 may be a portion of or separate from the discount key generator 154. In some instances, the discount key authorization module 156 can be associated with the CRM system's discount key authorization module 112, using the discount key authorization module's 112 functionality to access the relevant customer, sales person, and product data related to discounts from the CRM system 102. In other instances, the discount key authorization module 156 may access local and/or remote information to determine whether a particular discount is acceptable.

Memory 158 of the retail store system 144 may be similar to or different from the memory 118 of the CRM system 102. In the illustrated example, memory 158 includes a set of local sales data 160, a set of local customer data 162, and a set of local sales person information 164. The local customer data 162 may include locally entered or locally stored information regarding potential customers. The local sales data 160 may be local records associated with a current prospective sale as well as a completed sale. The local sales person information 164 may describe particular sales persons, as well as their particular authorizations to offer discounts. In some instances, these various sets of information may be stored temporarily at the retail store system 144 prior to being sent to the CRM system 102 for persistent storage. In other instances, the information may also be persisted at the retail store system 144, instead or in addition to persisting the data at the CRM system 102. By keeping the information locally, initial negotiations need not be associated with or connected to the CRM system 102, allowing for a preliminary check and analysis to be performed at the retail store system 144. In those instances, the generated discount key can be analyzed a second time at the CRM system 102 when the sale is being finalized. In some instances, most of the information may be available at the local retail store system 144, while a portion may be remotely located at the CRM system 102. For example, the sales person and customer information may be locally available, while the product catalog information may be stored at the CRM system 102. Through network 142, the B2B sales application 152 and the discount key generator 154 can communicate with the CRM system 102 and its various components to identify and interact with the product catalog 120, as needed. In other instances, sales person information and customer information may also be accessed and used from the remote CRM system 102.

The illustrated environment of FIG. 1 also includes the client 168, or multiple clients 168. The client 168 may be any computing device operable to connect to or communicate with at least the CRM system 102 via the network 142 using a wireline or wireless connection. In general, the client 168 comprises an electronic computer device operable to receive, transmit, process, and store any appropriate data associated with the environment 100 of FIG. 1.

The illustrated client 168 includes a client application 174. The client application 174 is any type of application that allows the client 168 to perform a transaction with the CRM system 102 using the generated discount key created after negotiations with a sales person. In some implementations, the client application 174 can be and/or include a Web browser. In some implementations, the client application 174 can use a discount key entered by a corresponding user to access a particular set of transaction data from the CRM system 102. For example, a user of the client 168 may enter, in any suitable format (i.e., text entry, bar code scanning, etc.), a discount key into the client application 174. The client application 174 can provide that information to the CRM system 102, where the CRM system 102 can evaluate and identify the corresponding discount and product information associated with the discount key (e.g., using the discount key information retriever module 116). Using the information associated with the discount key, the user of the client 168 can complete the transaction through a suitable e-commerce channel, while still receiving the benefits of individually negotiated terms.

The illustrated client 168 further includes an interface 170, a processor 172, and a memory 176. The interface 170 is used by the client 168 for communicating with other systems in a distributed environment—including within the environment 100—connected to the network 142; for example, the CRM system 102, as well as other systems communicably coupled to the network 142 (not illustrated). Generally, the interface 170 comprises logic encoded in software and/or hardware in a suitable combination and operable to communicate with the network 142. More specifically, the interface 170 may comprise software supporting one or more communication protocols associated with communications such that the network 142 or interface's hardware is operable to communicate physical signals within and outside of the illustrated environment 100.

As illustrated in FIG. 1, the client 168 includes a processor 172. Although illustrated as a single processor 172 in FIG. 1, two or more processors may be used according to particular needs, desires, or particular implementations of the environment 100. Each processor 172 may be a central processing unit (CPU), an application specific integrated circuit (ASIC), a field-programmable gate array (FPGA), or another suitable component. Generally, the processor 172 executes instructions and manipulates data to perform the operations of the client 168. For example, the processor 172 executes the functionality of the client application 174 required to send requests to the CRM system 102 and to receive and process responses from the same. GUI 178 of the client 168 may be similar to the GUI 150 of the retail store system 144, such that the GUI 178 generates and/or provides visual representations of the client application 174.

The illustrated client 168 also includes a memory 176, or multiple memories 176. The memory 176 may include any memory or database module and may take the form of volatile or non-volatile memory including, without limitation, magnetic media, optical media, random access memory (RAM), read-only memory (ROM), removable media, or any other suitable local or remote memory component. The memory 176 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client 168. Additionally, the memory 176 may include any other appropriate data, such as VPN applications, firmware logs and policies, firewall policies, a security or access log, print or other reporting files, as well as others.

There may be any number of clients 168 associated with, or external to, the environment 100. For example, while the illustrated environment 100 includes one client 168, alternative implementations of the environment 100 may include multiple clients 168 communicably coupled to the CRM system 102 and/or the network 142, or any other number suitable to the purposes of the environment 100. Additionally, there may also be one or more additional clients 168 external to the illustrated portion of environment 100 that are capable of interacting with the environment 100 via the network 142. Further, the term "client" and "user" may be used interchangeably as appropriate without departing from the scope of this disclosure. Moreover, while the client 168 is described in terms of being used by a single user, this disclosure contemplates that many users may use one computer, or that one user may use multiple computers.

The illustrated client 168 is intended to encompass any computing device such as a desktop computer, laptop/notebook computer, wireless data port, smart phone, personal data assistant (PDA), tablet computing device, one or more processors within these devices, or any other suitable processing device or computer. For example, the client 168 may comprise a computer that includes an input device, such as a keypad, touch screen, or other device that can accept user information, and an output device that conveys information associated with the operation of the CRM system 102 or the client 168 itself, including digital data, visual information, or the GUI 178, as shown with respect to the client 168.

FIG. 1 further includes a discount key generator 143 remotely located from the CRM system 102 and the retail store system 144. In some instances, the remote discount key generator 143 can allow sales persons from any location to generate discount keys quickly and efficiently for prospective customers. In some instances, the discount key generator 143 may be a web service, a web-based application, or any other suitable program, service, or application, including an application executing on a mobile device or other suitable system, that can remotely access the information needed to authorize discounts and generate a corresponding discount key based on negotiations between a prospective customer and a sales person. The remote discount key generator 143 may represent a centralized point of communication with an authentication system, such as a tool for value-added resellers or other sales entities located outside the immediate organization of the entity associated with the CRM system 102.

Figure 2:
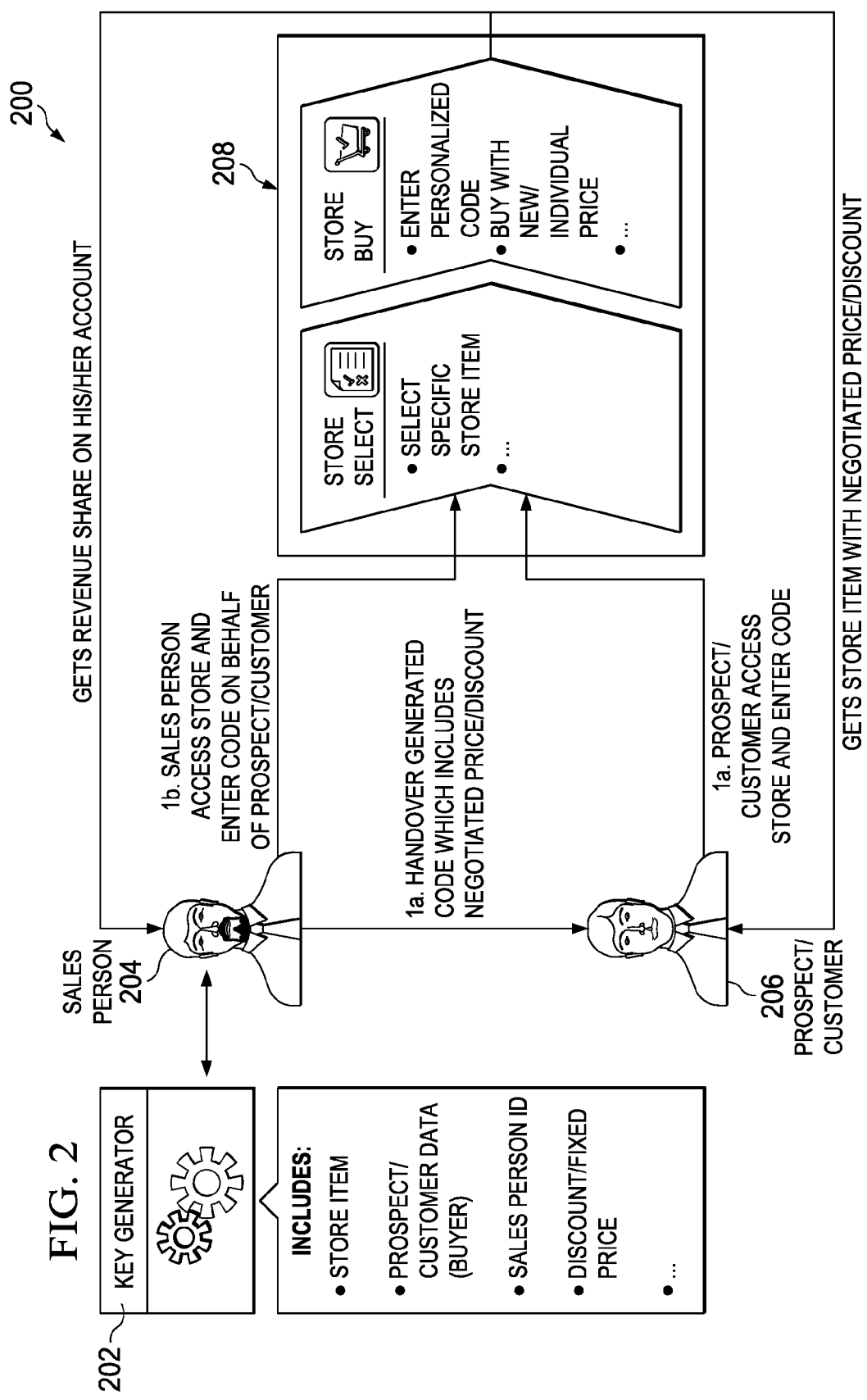
FIG. 2 is an example illustration of an transaction flow of the generation and use of a discount key.

FIG. 2 is an example illustration of an example transaction flow 200 that can occur using a system such as the one illustrated in FIG. 1. Any suitable organization or implementation of some, all, or additional components within environment 100 may be used. This example illustration is meant to be illustrative, but not exhaustive, and alternative implementations and flows, such as those illustrated in FIG. 3, may be used as appropriate.

Initially, a sales person 204 and a prospective customer 206 may interact to negotiate one or more products and/or services for purchase by the prospective customer 206. The negotiated prices may represent a discount based on a standard purchase price, such that the prospective customer 206 realizes a costs savings on the purchase when interacting with the sales person 204. The sales person 204 may be associated with a retail environment, or through telephonic or online sales with a backend CRM system. In some cases, the sales person 204 may be able to assist the customer 206 offline situations. In those instances, the sales person 204 can use a local discount key generator and downloaded price/item lists. In those instances, authorization may be performed locally and at the time of use of the discount key. Contact between the sales person 204 and the prospective customer 206 may be in person, by telephone, by web chat, by email, or by any other suitable means. In general, however, a set of products and/or services are agreed upon, along with a set of negotiated prices and/or discounts on those items.

Once agreed upon, the sales person 204 can enter the corresponding information into a discount key generator 202. The discount key generator 202, as described in FIG. 1, can combine various sets of data associated with a negotiated sale to create a discount key. The discount key can be associated with various aspects of the sale, including the items to be purchased and the negotiated prices. In some instances, the discount key can itself include the particular items to be purchased and their corresponding prices, or, alternatively, the discount key can reference an entry in a retail store system or backend CRM system where the sales and pricing information is stored. In general, the discount key can include or reference a set of information including one or more store items for purchase, information associated with the prospective customer, information associated with the sales person, the discounted prices of the one or more store items for purchase, and any other suitable information. In some instances, that data can be entered by the sales person 204 into a local computing device (e.g., a laptop, a tablet, a smartphone, a desktop computer, etc.). The data can then be processed by the discount key generator 202 to determine (1) whether the proposed discount for each item is authorized or allowed, (2) whether the sales person is authorized or allowed to offer the discount, and (3) whether the customer is authorized or allowed to receive the discount. In alternative instances, the above determinations can occur at or in the discount key generator 202 or after the discount key's generation and in a back end system, such as when the customer 206 or sales person 204 attempts to use the discount key. Once the discount is confirmed, the discount key generator 202 can combine the data to create the discount key. In various implementations, the discount key may be encoded or represented as a barcode (1-D, 2-D, etc.), a hashed (or other encrypted) text string, a non-hashed text string, a reference number associated with a record stored in a separate location, or any other suitable format.

Two scenarios are illustrated in FIG. 2, one denoted by (1a) and one denoted by (1b). In (1a), once the discount key is generated, the sales person 204 provides the generated code to the prospective customer. The discount key may be provided as a handwritten representation of the key, a printed representation of the key, an electronically mailed version of the key, a faxed version of the key, or any other suitable provision. Following the (1a) instance, the prospective customer 206 can then interact with the web-based e-commerce store 208, by providing the discount key through the web or systems interface of the e-commerce store 208 associated with the backend CRM system. In (1b), the sales person 204 can directly access the e-commerce store 208 and enter the discount key on behalf of the prospective customer 206. In either instance (1a) or (1b), providing the discount key to the e-commerce store 208 may be by manual entry of the discount key (e.g., typing the discount key into a field associated with the e-commerce store 208), or an automated process launched by providing the discount key (e.g., scanning a barcode representing the discount key, activating a hyperlink associated with the discount key, etc.).

The discount key can be analyzed, decrypted, and/or otherwise used to determine one or more items associated with the discount key and to be purchased in the e-commerce store 208. In some instances, the items associated with the discount key can be added to a shopping cart or other sales mechanism at the negotiated prices or discounts defined in association with the discount key. In other instances, when the prospective customer 206 or the sales person 204 add particular items to the shopping cart or other sales mechanism, those items will have the negotiated prices, as opposed to the standard pricing. In some instances, additional items may be added to the shopping cart, in addition to those associated with the discount key.

Once shopping is complete, the sales may be finalized with the negotiated prices applied to the negotiated items, allowing the prospective customer 206 to receive the agreed-upon items at the discounted price. Similarly, the sales person 204 can be credited with the corresponding sale, such as by having a sales account associated with the sales person credited for the sale. By doing so, the sales person 204 can receive credit for the sale, while allowing the e-commerce store 208 and its backend and associated functionality to handle the fulfillment of the purchase.

Figure 3:
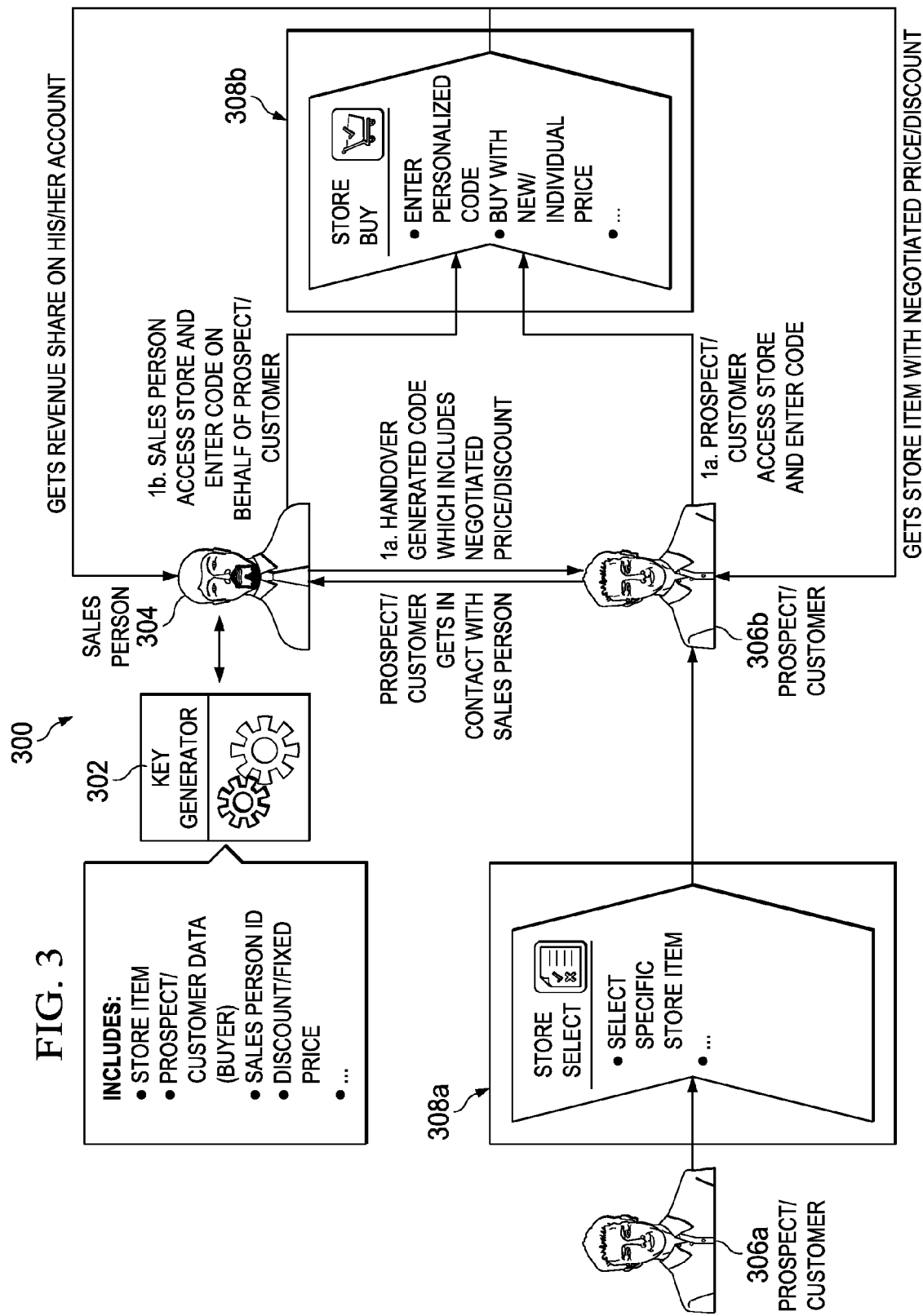
FIG. 3 is an example illustration of an alternative transaction flow of the generation and use of a discount key.

FIG. 3 is an example illustration of an alternative transaction flow 300 that can occur using a system such as the one illustrated in FIG. 1, where a customer initially identifies specific items for purchase within an e-commerce store 308 prior to negotiating discounted prices with a sales person 304. Any suitable organization or implementation of some, all, or additional components within environment 100 may be used. This example illustration is meant to be illustrative, but not exhaustive, and alternative implementations and flows may be used as appropriate.

In the illustrated example, the prospective customer 306a (representing the prospective customer 306 during his initial actions) interacts with the e-commerce store 308a (representing an initial aspect of the e-commerce store 308) to identify one or more items of interest within the e-commerce store 308. After identifying the items of interest and saving those items within the e-commerce store 308, the prospective customer 306b (representing the prospective customer 306 after selecting the items) contacts the sales person 304 in a buying or purchasing collaboration to assist with the purchase and negotiate the prices. The negotiation can occur online (e.g., email/chat), over the phone, or in person, allowing for a personalized sales experience. In some instances, the e-commerce store 308 may provide to the prospective customer 306 one or more connections, numbers, or addresses to interact with sales persons 304. Upon negotiating the discounted prices or general discount, the sales person 304 can use the discount key generator 302 to generate a prospective customer-specific discount key.

Once the key is generated, the sales person 304 can provide the prospective customer 306b with the discount key (as shown by (1a)), or the sales person 304 can enter the discount key into the e-commerce store 308b on behalf of the prospective customer 306b. In some instances, the prospective customer's previous selection of specific items will be updated with the negotiated prices, allowing the prospective customer 306b to complete the transaction based on the prior selections. In other instances, the discount key can be used to populate the shopping cart in a new session with the negotiated prices.

The transaction can then be completed within the e-commerce solution 308b, such that the prospective customer 306b receives the store item at the negotiated price or discount, while the sales person 304 receives credit and/or compensation for the sale. At the same time, the fulfillment of the purchase can be managed and fulfilled by the e-commerce store 308b moving forward.

Figure 4:
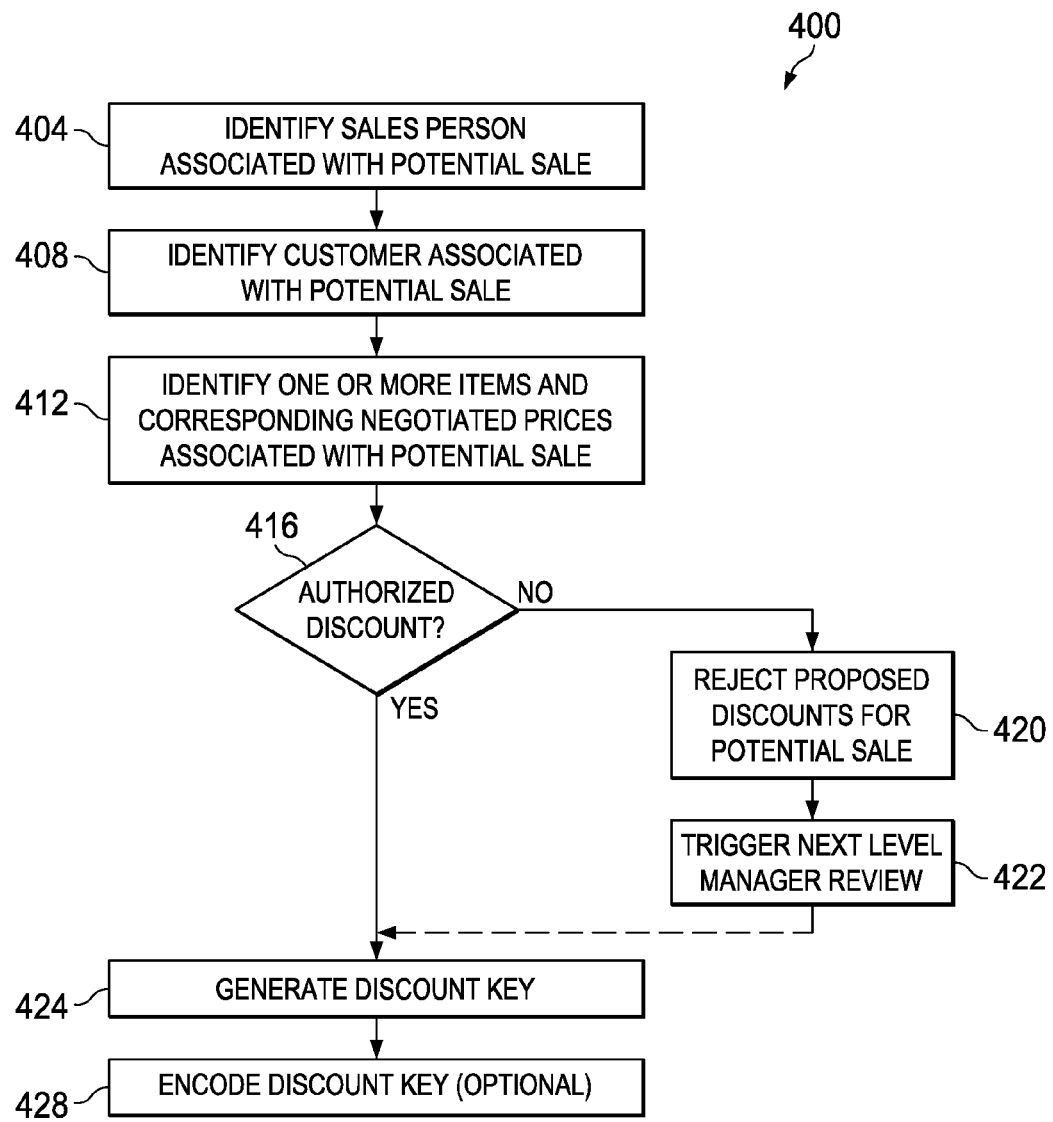
FIG. 4 is a flowchart of an example method for creating a discount key.

FIG. 4 is a flowchart of an example method 400 for creating a discount key. For clarity of presentation, the description that follows generally describes method 400 in the context of FIG. 1. However, it will be understood that method 400 may be performed, for example, by any other suitable system, environment, software, and hardware, or a combination of systems, environments, software, and hardware, as appropriate.

At 404, a sales person associated with the potential sale is identified. In some instances, this may involve the sales person entering a login into a retail store system or, alternatively, a remote web application or service, or on a native app or application on a mobile device. At 408, a prospective customer associated with a potential sale or transaction is also identified. In some instances, identifying the prospective customer may involve identifying a particular customer ID, a particular customer shopping cart, or other customer-specific identification. At 412, one or more items and corresponding negotiated prices associated with the potential sale are identified. The one or more items can be initially identified by the prospective customer in an e-commerce store prior to contacting the sales person. In other instances, the one or more items may be identified during consultation with the sales person while designing a customer-specific solution or set of items, using the expertise of the sales person to ensure that the identified items will satisfy the needs of the prospective customer. The prices of each item can be negotiated during interactions between the prospective customer and the sales person. Once the item set and corresponding negotiated prices are identified, method 400 continues at 416.

At 416, a determination of whether the discount is authorized is made. Different levels of discounts may be applied or negotiated based on various factors, including the type of customer, the size of the order, manufacturer requirements, internal sales entity terms and restrictions, and product availability, among others. In some instances, particular sales persons may be allowed to offer certain levels of discounts based on seniority, position, or performance, among others, while different customers may be allowed to receive different levels of discounts based on the size of the customer, prior orders, and previous negotiated rates, among others. The determination for whether the discount is authorized may be based on an evaluation of customer-specific authorizations, sales person-specific authorizations, and product or item-specific authorizations. If the discount is authorized, method 400 continues to 424. If, however, the discount is not authorized, method 400 moves to 420. At 420, the proposed discounts are rejected for the potential sale. Further, at 422, a next level manager review is triggered. In some instances, the next level manager can approve the proposed discount, and method 400 may continue at 424.

At 424, the discount key is generated. The discount key can be generated based, at least in part, of a combination of the items selected during the negotiation phase, a customer identification or identifier (ID), a sales person name or ID, and the negotiated discount or prices, among others, where appropriate. In some instances, the generated discount key may be a reference value, such that a record of the items selected and negotiated prices can be retrieved based on the discount key. In other instances, the discount key may include or encode (at 428) the various parameters defining the items and discounts. Encoding the parameters may include hashing or encrypting the discount key, as well as encoding the parameters within a barcode, as well as other suitable encoding. The discount key can then be provided to the prospective customer and used at a later time.

Figure 5:
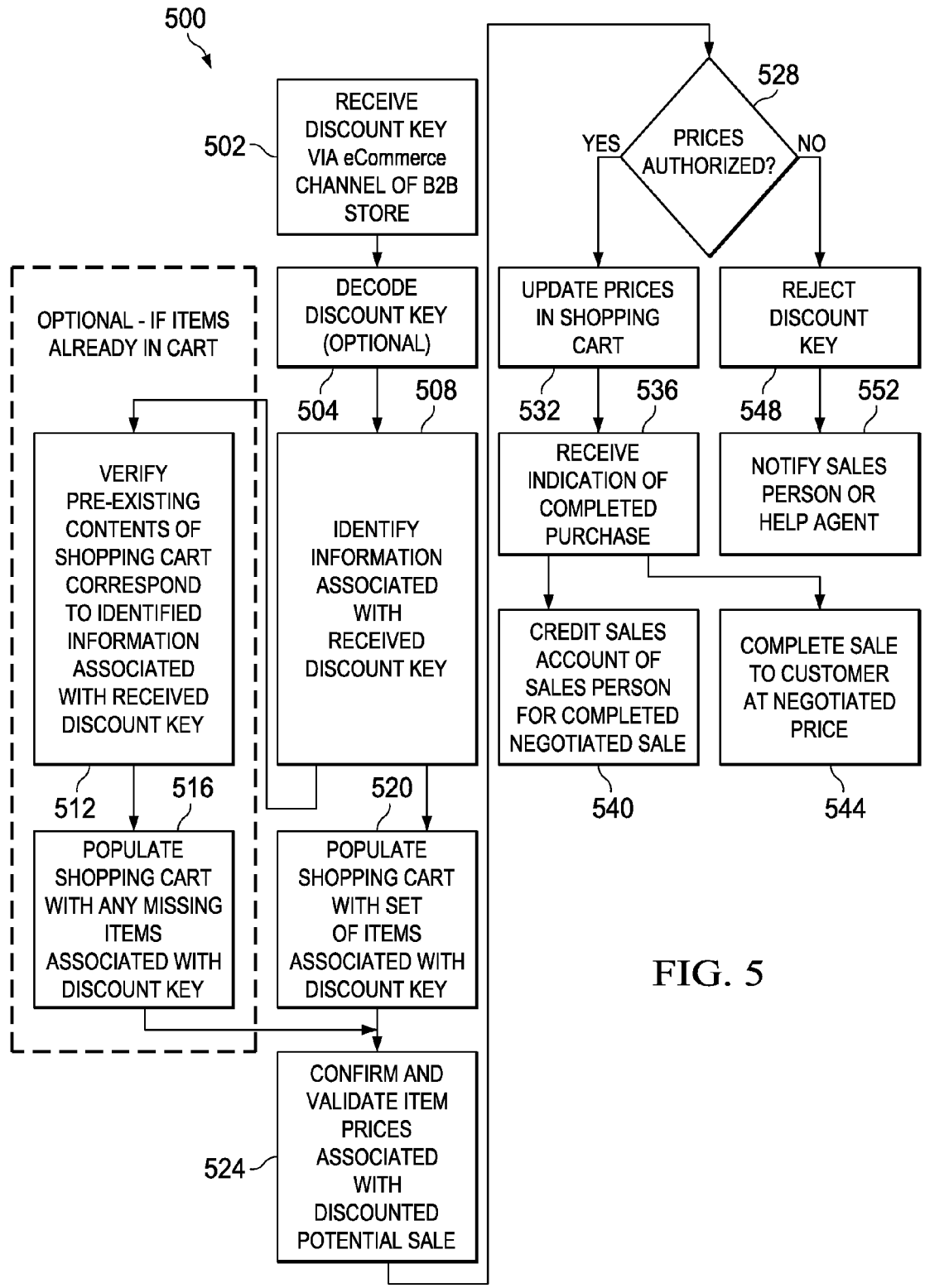
FIG. 5 is a flowchart of an example method for using a previously generated discount key to perform a sales transaction.

FIG. 5 is a flowchart of an example method 500 for using a previously generated discount key to perform a sales transaction. For clarity of presentation, the description that follows generally describes method 500 in the context of FIG. 1. However, it will be understood that method 500 may be performed, for example, by any other suitable system, environment, software, and hardware, or a combination of systems, environments, software, and hardware, as appropriate.

At 502, a discount key is received via an e-commerce channel of a B2B (or B2C, as appropriate) store. For example, the discount key may be received through a web interface, service, or other application associated with the B2B store. In some instances, a remote application or agent of the B2B store may be available at a retail store or at a particular client. Further, the received discount key may be received as a text string entered at a client system or other location, a barcode scanned using a barcode scanner (e.g., a dedicated barcode scanner, a smartphone application, etc.), an RFID-based signal, or in any other suitable manner. At 504, the discount key can be decoded to identify at least some identifying information. If the discount key is used as a reference to a particular entry in the backend system, the discount key may not need to be decoded. If the discount key encodes information defining information on the items selected, discounted prices, and customer information, then the discount key can be decoded based on one or more decoding algorithms appropriate for the type of prior encoding.

At 508, information associated with the received, and in some cases, decoded, discount key can be identified. The information can include information describing the particular items associated with the discount key, the discounted price or discount percentage previously negotiated and associated with the particular items, customer information, sales person information, and other data or information associated with the discount key. In some instances, at least part of the information associated with the discount key may be stored apart from the discount key itself, where the discount key provides a reference ID, link, or other set of information that can be used to access stored records and parameters associated with the discount key. In some instances, for protection of customer information, for example, the discount key may include a customer reference ID within the discount key, such that when the discount key is analyzed, the corresponding customer record can be located based on the customer reference ID. In some instances, the entire discount key may be a reference ID to a discount key record stored in a backend database or other system.

In some instances, and as illustrated in example FIG. 2, the prospective customer may be starting a new transaction, such that a shopping cart within the B2B store is populated with at least the items associated with the discount key at 520. In alternative instances, and as illustrated in example FIG. 3, the prospective customer may have added one or more of the items into a shopping cart associated with the B2B store prior to providing the discount key. In those instances, method 500 moves from 508 to 512, where the pre-existing contents of the shopping cart (or other sales mechanism) are checked or verified to confirm that the shopping cart corresponds to the identified items included in the discount key. Where one or more of the items are missing, the shopping cart can be populated with the missing items associated with the discount key at 516.

At 524, the negotiated prices of the items associated with the discount key and the discounted potential sales are confirmed and validated. At 528, a determination is made as to whether the negotiated discount prices of the items are authorized. This determination can be based on customer-specific, item-specific, and/or sales person-specific rules for allowable prices. For customer-specific parameters, a particular customer may be eligible for a predefined range of discounts. In the corresponding determination, whether the customer is allowed to receive a particular discount is determined. Similarly, for sales person-specific parameters, the sales person associated with the discount key may be limited in the level and/or amount of discount that can be offered. The analysis here determines whether the discount provided is within the allowed amounts. Further, in item-specific determinations, an analysis determines whether the item price is within the negotiated range allowed or authorized by the seller or manufacturer. In some cases, the discounts may be acceptable when initially offered, but unacceptable when attempted to be redeemed (e.g., when the discount key has expired, authorizations of the sales person have changed, or the discount key has been previously used, as well as other similar situations). In other instances, the discounts may not be initially analyzed to determine if they are proper, but only upon attempted redemption. In either instance, additional analysis at the time of redemption can be helpful to determine if the prices should be honored. If the negotiated prices are authorized, method 500 continues to 532. If the negotiated prices are not authorized, method 500 moves to 548, where the discount key, or at least a portion of the negotiated prices, is rejected. At 552, the sales person assisting with the sale, or a help agent associated with the B2B sales system, may be notified of the rejection. In some cases, an opportunity to approve or amend the originally negotiated discount may be available, allowing the sale to be completed without significant delay. A manager or other person with the appropriate authorizations may work with the prospective customer to move forward in the transaction, as appropriate. In some instances, the rejection notification may trigger a workflow processing behind the transaction, where one or more persons having no personal interaction with the prospective customer may evaluate whether the discount is to be allowed or modified.

If the prices are authorized, method 500 continues at 532, where the prices of the items associated with the discount key are updated in the corresponding shopping cart. At 536, an indication may be received of the completed purchase or sale. In response, the sale is completed for the customer at the negotiated prices at 544, while the sales account of the sales person associated with the completed sale is credited in response to the completed sale at 540.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method, the method comprising:

identifying a discount key at a sales system provided by a prospective customer, the discount key exclusively associated with a prospective sale previously negotiated between a sales person and a prospective customer, the discount key associated with the prospective sale based on a unique identifier associated with the discount key, the discount key generated by a discount key generator in response to completion of the previously negotiated prospective sale by a prospective sale system located remote from and disparate to the sales system, the discount key generator associated with the prospective sale system and remote from the sales system, wherein the discount key is associated with discount key data at the prospective sale system, and wherein the discount key data is remotely accessible by the sales system;

determining at least one item associated with the identified discount key and the prospective sale based on the identified discount key;

determining at least one discount associated with the at least one determined item associated with the identified discount key and the prospective sale based on the identified discount key;

facilitating completion of the prospective sale at the sales system for the prospective customer based on the at least one determined item and the at least one determined discount associated with the at least one determined item based on the identified discount key, wherein facilitating completion includes:

determining that the at least one discount associated with at least one determined item associated with the identified discount key is an authorized discount, wherein determining that the at least one discount is an authorized discount includes using the unique identifier associated with the discount key by the sales system to remotely access discount key data stored at the prospective sale system; and in response to determining that the at least one discount is the authorized discount, populating an empty shopping cart at the sales system with the at least one item at the associated discount price associated with the identified discount key; and associating the completion of the prospective sale at the sales system with a sales account for the sales person associated with the prospective sale, wherein associating the completion of the prospective sale at the sales system with the sales account for the sales person comprises updating the sales account for the sales person by crediting the completed sale to the sales person.

2. The method of claim 1, where the identified discount key is encoded, further comprising decoding the identified discount key prior to determining the at least one item and the at least one discount associated with the at least one determined item.

3. The method of claim 2, wherein the decoded discount key includes a set of information associated with the prospective sale.

4. The method of claim 2, where the identified discount key is encoded as a barcode or a QR code, wherein decoding the identified discount key includes reading contents of the barcode or the QR code.

5. The method of claim 2, where the identified discount key is encoded via encryption, where decoding the identified discount key includes decrypting the encrypted discount key.

6. The method of claim 1, wherein the discount key is associated with a reference identifier to a specific discount record at the sales system, the method further comprising:

accessing the specific discount record associated with the discount key in the sales system in response to identifying the discount key; and using at least a portion of the specific discount record to determine at least a portion of the prospective sale information associated with the discount key.

7. The method of claim 1, wherein the discount key includes at least a subset of the following:

at least one item associated with the negotiated sale;
at least one discounted price associated with at least one of the items associated with the negotiated sale;
a set of sales person-specific information; and
a set of prospective customer data.

8. The method of claim 1, wherein the discount key is generated in response to negotiations between the sales person and the prospective customer at a retail store location remote from the sales system.

9. The method of claim 1, further comprising fulfilling the completion of the prospective sale via operations performed by the sales system.

10. The method of claim 1, wherein the discount key is generated, in response to a request to generate the discount key by the sales system, remotely from the location of the sales person.

11. The method of claim 1, wherein the sales person is located remotely from the prospective customer.

12. A system comprising:

one or more computers associated with a sales system;
a computer-readable medium coupled to the one or more computers having instructions stored thereon which, when executed by the one or more computers, cause the one or more computers to perform operations comprising:

identifying, at the sales system, a discount key provided by a prospective customer, the discount key exclusively associated with a prospective sale previously negotiated between a sales person and a prospective customer, the discount key associated with the prospective sale based on a unique identifier associated with the discount key, the discount key generated by a discount key generator in response to completion of the previously negotiated prospective sale by a prospective sale system located remote from and disparate to the sales system, the discount key generator associated with the prospective sale system and remote from the sales system, wherein the discount key is associated with discount key data at the prospective sale system, and wherein the discount key data is remotely accessible by the sales system;

determining at least one item associated with the identified discount key and the prospective sale based on the identified discount key;

determining at least one discount associated with the at least one determined item associated with the identified discount key and the prospective sale based on the identified discount key;

facilitating completion of the prospective sale at the sales system for the prospective customer based on the at least one determined item and the at least one determined discount associated with the at least one determined item based on the identified discount key, wherein facilitating completion includes:

determining that the at least one discount associated with at least one determined item associated with the identified discount key is an authorized discount, wherein determining that the at least one discount is an authorized discount includes using the unique identifier associated with the discount key by the sales system to remotely access discount key data stored at the prospective sale system; and in response to determining that the at least one discount is the authorized discount, populating a shopping cart associated with the sales system with the at least one item at the associated discount price associated with the identified discount key; and associating the completion of the prospective sale with a sales account for the sales person associated with the prospective sale, wherein associating the completion of the prospective sale at the sales system with the sales account for the sales person comprises updating the sales account for the sales person by crediting the completed sale to the sales person.

13. The system of claim 12, where the identified discount key is encoded, further comprising decoding the identified discount key prior to determining the at least one item and the at least one discount associated with the at least one determined item.

14. The system of claim 13, wherein the decoded discount key includes a set of information associated with the prospective sale.

15. The system of claim 13, where the identified discount key is encoded as a barcode, wherein decoding the identified discount key includes reading contents of the barcode.

16. The system of claim 13, where the identified discount key is encoded via encryption, where decoding the identified discount key includes decrypting the encrypted discount key.

17. The system of claim 12, wherein the discount key is associated with a reference identifier to a specific discount record at the sales system, the one or more computers further performing operations comprising:
  accessing the specific discount record associated with the discount key in the sales system in response to identifying the discount key; and
  using at least a portion of the specific discount record to determine at least a portion of the prospective sale information associated with the discount key.

18. The system of claim 12, wherein the discount key includes at least a subset of the following:
  at least one item associated with the negotiated sale;
  at least one discounted price associated with at least one of the items associated with the negotiated sale;
  a set of sales person-specific information; and
  a set of prospective customer data.

19. A computer program product encoded on a non-transitory storage medium, the product comprising computer readable instructions for causing one or more processors to perform operations comprising:
  identify a discount key provided by a prospective customer, the discount key exclusively associated with a prospective sale previously negotiated between a sales person and a prospective customer, the discount key associated with the prospective sale based on a unique identifier associated with the discount key, the discount key generated by a discount key generator in response to completion of the previously negotiated prospective sale by a prospective sale system located remote from and disparate to the sales system, the discount key generator associated with the prospective sale system and remote from the sales system, wherein the discount key is associated with discount key data at the prospective sale system, and wherein the discount key data is remotely accessible by the sales system;
  determine at least one item associated with the identified discount key and the prospective sale based on the identified discount key;
  determine at least one discount associated with the at least one determined item associated with the identified discount key and the prospective sale based on the identified discount key;
  facilitate completion of the prospective sale at the sales system for the prospective customer based on the at least one determined item and the at least one determined discount associated with the at least one determined item based on the identified discount key, wherein facilitating completion includes:
    determining that the at least one discount associated with at least one determined item associated with the identified discount key is an authorized discount, wherein determining that the at least one discount is an authorized discount includes using the unique identifier associated with the discount key by the sales system to remotely access discount key data stored at the prospective sale system; and
    in response to determining that the at least one discount is the authorized discount, populating a shopping cart associated with the sales system with the at least one item at the associated discount price associated with the identified discount key; and
  associate the completion of the prospective sale at the sales system with a sales account for the sales person associated with the prospective sale, wherein associating the completion of the prospective sale at the sales system with the sales account for the sales person comprises updating the sales account for the sales person by crediting the completed sale to the sales person.

* * * * *